United States Patent
Tanaka et al.

(10) Patent No.: US 10,660,335 B2
(45) Date of Patent: May 26, 2020

(54) PLANT DISEASE CONTROL AGENT

(75) Inventors: Keijitsu Tanaka, Ibaraki (JP); Yusuke Amaki, Ibaraki (JP); Motoki Tanaka, Ibaraki (JP); Mutsumi Miyazaki, Ibaraki (JP)

(73) Assignee: SDS BIOTECH K.K., Chuo-ku, Tokyo (JP)

( * ) Notice: Subject to any disclaimer, the term of this patent is extended or adjusted under 35 U.S.C. 154(b) by 518 days.

(21) Appl. No.: 14/363,013

(22) PCT Filed: Dec. 22, 2011

(86) PCT No.: PCT/JP2011/079819
§ 371 (c)(1),
(2), (4) Date: Jun. 5, 2014

(87) PCT Pub. No.: WO2013/094055
PCT Pub. Date: Jun. 27, 2013

(65) Prior Publication Data
US 2014/0309160 A1 Oct. 16, 2014

(51) Int. Cl.
*A01N 43/90* (2006.01)

(52) U.S. Cl.
CPC .................. *A01N 43/90* (2013.01)

(58) Field of Classification Search
CPC .................................................. A01N 43/90
See application file for complete search history.

(56) References Cited

U.S. PATENT DOCUMENTS

| 6,183,736 B1 | 2/2001 | Moyne et al. | |
| 6,284,286 B1 * | 9/2001 | Arimoto | A01N 25/30 |
| | | | 424/600 |

FOREIGN PATENT DOCUMENTS

| DE | 196 41 213 A1 | 4/1998 | |
| JP | WO 2010002026 A2 * | 1/2010 | ............ A01N 43/40 |
| WO | 2004/111240 A2 | 12/2004 | |

OTHER PUBLICATIONS

Tanaka et al, J. Agric. Food Chem., vol. 62:1469-1476 (Jan. 21, 2014).*

(Continued)

*Primary Examiner* — Randall L Beane
(74) *Attorney, Agent, or Firm* — Sughrue Mion, PLLC

(57) ABSTRACT

The present invention relates to a plant disease control agent containing a compound represented by the following formula (1) or salt thereof as an active ingredient (in the formula, $R^1$ and $R^2$ represents a hydrogen atom or methyl group but excepting cases where $R^1$ and $R^2$ are the same), a plant disease controlling method applying the plant disease control agent on plants suffering from diseases, and a novel compound represented by formula (1) or salt thereof.

(1)

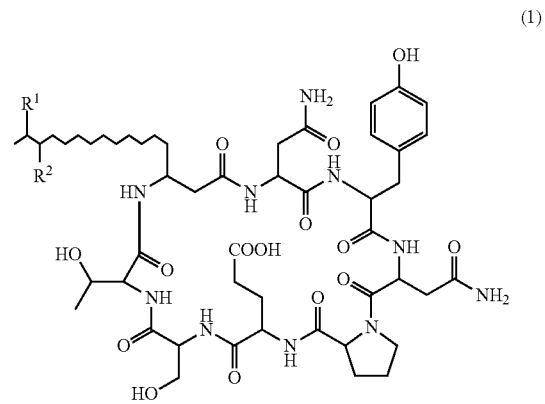

6 Claims, 2 Drawing Sheets

(56) References Cited

OTHER PUBLICATIONS

Mikkola et. al., Arch. Microbiol., vol. 181:314-323 (2004).*
Tanaka et al., J. Agric. Food Chem., vol. 63:5344-5353 (May 15, 2015).*
Dexter et al., Peptides as functional Surfactants, Ind. Eng. Chem. Res., vol. 47:6391-6398 (2008).*
Thasana et al., FEBS Letters, vol. 584:3209-3214 (2010).*
Choudhary et al., Microbiological Research, vol. 164:493-513 (2009).*
Raubitschek, et al., "An Antibiotic Active Against Dermatophytes, Derived from Bacillus Subtilis" Dermatologyca, vol. 100 pp. 45-49 Published 1950.
Volpon, et al., "NMR Structure determination of a synthetic analogue of bacillomycin Lc reveals the strategic role of L-Asn1 in the natrual iturinic antiobiotics", Spectrochimica acta part A 67, pp. 1374-1381, Published 2007.
Mhammedi, et al., "Bacillomycin F, A New Antibiotic of Iturin Group: Isolation and Characterization", Journal of Antibiotics, vol. 35, pp. 306-311, Published Mar. 1982.
Hiradate. et al., "Mulberry anthracnose antagonists (iturins) produced by Bacillus amyloliquefaciens RC-2" Phytochemistry, vol. 61, pp. 693-698, Published 2002.
Walton, et al., "A Crystalline Antifungal Agent, Mycosubtilin, Isolated From Subtilin Broth" J. Clin. Invest, vol. 28, pp. 924-926, Published 1949.
Isogai. et al., "Structures of B-Amino Acids in Antibiotivs Inturin A" Tetrahedron Letters, vol. 23, pp. 3065-3068, Published 1982.
Peypoux. et al., "Revised Structure of Mycosubtilin, a Peptidolipid Antibiotic from Bacillus Subtilis", Journal of Antibiotics, vol. 39, pp. 636-641, Published 1986.
Winkelmann et al., "Iturin A—a New Long Chain Iturin A Possessing an Unusual High Content of Amino Acids", Journal of Antibiotics, vol. 36, pp. 1451-1457, Published 1983.
Bland. et al., "HPLC separation and antifungal activity of the naturally occurring iturin-A homologs", Peptides 1992: proceedings of the Twenty-Second European Peptide Symposium; Schneider, C.H., Eberle, A.N. Eds.: ESCOM: Leiden, 1993; pp. 332-333.
Oleinikova. et al., "Bacillomycin D From the Marine Isolate of the Bacterium Bacillus subtilis KMM", Chemistry of Natural Compounds, vol. 41, No. 2, pp. 240-242, Published 2005.
Moyne. et al., "Bacillomycin D: an iturin with antifungal activity against Aspergillus flavus", Journal of Applied Microbiology, vol. 90, pp. 622-629, Published 2001.
Landy. et al., "Bacillomycin: an Antibiotic from Bacillus subtilis Active against Pathogenic Fungi.", Proc. Soc. Exp. Biol. Med., vol. 67, pp. 539-541, Published 1948.

Peypoux. et al., "Structure of bacillomycin F, a new peptidolipid antibiotic of the iturin group", Eur. J. Biochem., vol. 153, pp. 335-340, Published 1985.
Kajimura. et al., "Bacillopeptins, New Cyclic Lipopeptide Antibiotics from Bacillus subtilis FR-2" Journal of Antibiotics, vol. 48, pp. 1095-1103, Published 1995.
Eshita. et al., "Bacillomycin L a New Antibiotic of the iturin Group: Isolations, Structures, and Antifungal Activities of the Congeners", Journal of Antibiotics, vol. 48, pp. 1240-1247 (1995).
Torsten Stein, "Bacillus subtilis antibiotics: structures, syntheses and specific functions", Molecular Microbiology, vol. 56, pp. 845-857, Published 2005.
Peypoux. et al., "Structures of Bacillomycin D and Bacillomycin L Peptidolipid Antibiotics from Bacillus Subtilis", Journal of Antibiotics, vol. 37, pp. 1600-1604, Published 1984.
Peypoux. et al., "Structure of Bacillomycin D, a New Antibiotic of the Iturin Group", Eur. J. Biochem., vol. 118, pp. 323-327, Published 1981.
Koumoutsi. et al., "Structural and Functional Characterization of Gene Clusters Directing Nonribosomal Synthesis of Bioactive Cyclic Lipopeptides in Bacillus amyloliquefaciens Strain FZB42", Journal of Bacteriology, vol. 186, pp. 1084-1096, Published 2004.
Ongena. et al., Bacillus lipopeptides: versatile weapons for plant disease biocontrol:, Trends in Microbiology, vol. 16, pp. 115-125, Published 2007.
Tabbene. et al., "Anti-Candida effect of bacillomycin D-like lipopeptides from Bacillus subtilis B38", FEMS Microbiol. Lett., vol. 316, pp. 108-114, Published 2011.
Ramarathnam. et al., "Molecular and biochemical detection of fengycin- and bacillomycin D-Producing Bacillus spp., antagonistic to fungal pathogens of canola and wheat", Can. J. Microbiol., vol. 53, pp. 901-911, Published 2007.
Peypoux. et al., "Structure of Iturine A, a Peptidolipid Antibiotic from Bacillus subtilis", Biochemistry 13, pp. 3992-3996, Published 1978.
International Search Report for corresponding PCT/JP2011/079819 dated March 27, 2012.
International Preliminary Report on Patentability including the Written Opinion of the International Searching Authority dated Jul. 3, 2014 for corresponding PCT/JP2011/079819.
Zhenzhen Zhao et al.; "Study of the antifungal activity of *Bacillus vallismortis* ZZ185 in vitro and identification of its antifungal components"; Bioresource Technology; 101 (2010); pp. 292-297.
Communication, dated Jun. 17, 2019, issued by the Indian Intellectual Property Office in corresponding Application No. 5529/CHENP/2014.

\* cited by examiner

PLANT DISEASE CONTROL AGENT

CROSS REFERENCE TO RELATED APPLICATIONS

This is a National Stage of International Application No. PCT/JP2011/079819 filed Dec. 22, 2011, the content of all of which is incorporated herein by reference in its entirety.

TECHNICAL FIELD

The present invention relates to a plant disease control agent containing a novel compound having antimicrobial activity as an active ingredient, a plant disease controlling method applying the plant disease control agent on plants suffering from diseases, and novel Bacillomycin compounds.

BACKGROUND ART

Although various agricultural and horticultural antimicrobial agents (plant disease control agents) have been conventionally known, a more effective agent which can be more safely used is needed.

In such circumstance, *Bacillus* sp. bacterium is known to produce antimicrobial secondary metabolites. Among the antimicrobial secondary metabolites, cyclic peptide of the iturin class is the most important (Non-patent documents 1 and 2).

The cyclic peptide of the iturin class is a cyclic peptide having seven α-amino acids and one β-amino acid having an aliphatic side chain, and various compounds having different amino acid sequences and the structures of the side chain of β-amino acid (β-AA) have been reported. The structures of the iturin family having such a structure are shown in Table 1.

TABLE 1

| | 1 | 2 | 3 | 4 | 5 | 6 | 7 | Structure and carbon number of β-AA |
|---|---|---|---|---|---|---|---|---|
| Iturin A | Asn | Tyr | Asn | Gln | Pro | Asn | Ser | n-$C_{14}$, i-$C_{15}$, ai-$C_{15}$ |
| Iturin AL | Asn | Tyr | Asn | Gln | Pro | Asn | Ser | n-$C_{16}$, i-$C_{16}$ |
| Mycosubtilin | Asn | Tyr | Asn | Gln | Pro | Ser | Asn | n-$C_{16}$, i-$C_{16}$, ai-$C_{17}$ |
| Bacillomycin D | Asn | Tyr | Asn | Pro | Glu | Ser | Thr | n-$C_{14}$, i-$C_{15}$, ai-$C_{15}$ |
| Bacillomycin F | Asn | Tyr | Asn | Gln | Pro | Asn | Thr | n-$C_{16}$, i-$C_{17}$, ai-$C_{17}$ |
| Bacillomycin Lc | Asn | Tyr | Asn | Ser | Glu | Ser | Thr | n-$C_{14}$, i-$C_{15}$, ai-$C_{15}$, i-$C_{16}$ |

The structure of iturin A was reported by F. Peypoux et al. in 1978 (non-patent document 3), and the structure was reviewed by A. Isogai et al. in 1982 to determine the structure of Iturins A1 to A7 comprising β-amino acids having a side chain structures of n-C13, n-C14, ai-C15, i-C15, n-C15, i-C16 and n-C16 (n=normal; i=iso; ai=anteiso; the same shall apply hereinafter) (non-patent document 4). In the report, iturin comprising β-amino acid having a side chain of C14 and C15 accounts for a majority. However, G. Winkelman et al. reported iturin $A_L$ comprising β-amino acid having a side chain structure of C15 and C16 and showed that the component ratio of the side chain structure of β-amino acid is different depending on the strains (non-patent document 5). Furthermore, S. Hiradate et al. reported in 2002 the structure of Iturin A8 comprising β-amino acid having a side chain of ai-C17 from *B. amyloliquefaciens* RC-2, and all the structures of Iturins A1 to A8 were elucidated (non-patent document 6).

Mycosubtilin was discovered by R. Walton et al. in 1949 (non-patent document 7), and the structure comprising β-amino acid having side chains of n-C16, i-C16, i-C17 and ai-C17 and seven α-amino acids was determined by F. Peypoux et al. in 1986 (non-patent document 8).

Bacillomycin F was isolated from *B. subtilis* by A. Mhammedi et al. in 1982 (non-patent document 9), and the structure comprising β-amino acid having side chains of i-C16, i-C17 and ai-C17 and seven α-amino acids was determined by F. Peypoux et al. in 1985 (non-patent document 10).

Bacillopeptin was isolated by Y. Kajimura et al. in 1995 and the structure comprising β-amino acid having side chains of n-C14, i-C15 and i-C16 and seven α-amino acids was reported (non-patent document 11).

Bacillomycin Lc was isolated from *B. subtilis* by M. Eshita et al. in 1995 and the structure comprising β-amino acid having side chains of n-C14, ai-C15, i-C15, i-C16 and n-C16 and seven a-amino acids (the same sequence as that of Bacillopeptin) was elucidated (non-patent document 12).

Bacillomycin L was isolated from *B. subtilis* by M. Landy et al. in 1984 (non-patent document 13) and the structure comprising β-amino acid having side chains of n-C14, ai-C15, i-C15, i-C16 and n-C16 and seven α-amino acids was proposed by F. Peypoux et al. in 1984 (non-patent document 14). However, later, in 2007, the structure of α-amino acid was revised by L. Volpon et al. and it was revealed that Bacillomycin L has the same structure as Bacillomycin Lc (non-patent document 15).

Bacillomycin D was discovered by F. Raubitschek et al. in 1950 (non-patent document 16), and later, in 1981, the structure was once proposed by F. Peypoux et al. (non-patent document 17). In 1984, the structure was revised by F. Peypoux et al. to the one comprising β-amino acid having side chains of n-C14, ai-C15, i-C15, i-C16 and n-C16, two-molecule Asn and one molecule each of Tyr, Glu, Pro, Ser and Thr (non-patent document 14). In the report, β-amino acid has the component ratio of n-C14=47.6%, i-C15=22.7%, ai-C15=12.5%, i-C16=3.3% and n-C16=8.8%, in which Bacillomycin D comprising β-amino acids of C14 and C15 is the major component. In 2005, G. K. Oleinikova et al. isolated i-C15 Bacillomycin D from marine B. subtilis and determined the structure (non-patent document 18).

In 2001, A. C. Moyne et al. isolated two components having activity on *Aspergillus flavus* from *B. subtilis* and presumed the substances to be C15- and C16-Bacillomycin D (non-patent document 19 and patent document 1). In 2011, O. Tabbene et al. isolated from *B. subtilis* three active substances having antimicrobial effect on *Candida albicans* which is pathogenic to humans, and considered that these substances are C14-, C15- and C16-bacillomycin D by MALD f TOF/MS analysis (non-patent document 20). In 2004, A. Koumoutsi et al. presumed that C14, C15, C16 and a very small amount of C17 Bacillomycin D are present by the MALDI-TOF/MS analysis of the culture of *B. amyloliquefaciens* FZB42, but had no mention on the structure of the side chain of β-amino acid (non-patent document 21 and patent document 2). In 2007, R. Ramarathnam et al. analyzed the antimicrobial component of *B. subutilis* 49 strain by MALDI-TOF/MS and presumed the component to be Bacillomycin D containing a very small amount of C17 Bacillomycin D, but had no mention on the detailed structure of Bacillomycin D (non-patent document 22).

Meanwhile, there has been a report on the correlation between the structure and activity of cyclic peptide of the iturin class as set forth below. In 1993, J. M. Bland et al. studied on the structure of Iturin A and its activity on *Penicillium* and *Aspergillus* and reported the relationship of i-C16>n-C16>i-C15>n-C14=ai-C15 (non-patent document 23). Also, in 1995, M. Eshita et al. investigated the in-vitro activity of Bacillomycin Lc against the plant pathogens and revealed the relationships of n-C16>n-C14, i-C16>i-C15, n-C16≥i-C16 and i-C15≥ai-C15 (non-patent document 12). However, they had no mention on the activity of cyclic peptide of the iturin class having a C17 side chain.

PRIOR ART DOCUMENTS

Patent Documents

Patent Document 1: U.S. Pat. No. 6,183,736
Patent Document 2: International publication No. WO 2004/111240

Non-patent Documents

Non-patent Document 1: Molecular Microbiology 56, 845-857 (2005)
Non-patent Document 2: Trends in Microbiology 16, 115-125 (2007)
Non-patent Document 3: Biochemistry 17, 3992-3996 (1978)
Non-patent Document 4: Tetrahedron Letters 23, 3065-3068 (1982)
Non-patent Document 5: Journal of Antibiotics 36, 1451-1457 (1983)
Non-patent Document 6: Phytochemistry 61, 693-698 (2002)
Non-patent Document 7: J. Clin. Invest. 28, 924-926 (1949)
Non-patent Document 8: Journal of Antibiotics 39, 636-641 (1986)
Non-patent Document 9: Journal of Antibiotics 35, 306-311 (1982)
Non-patent Document 10: Eur. J. Biochem. 153, 335-340 (1985)
Non-patent Document 11: Journal of Antibiotics 48, 1095-1103 (1995)
Non-patent Document 12: Journal of Antibiotics 48, 1240-1247 (1995)
Non-patent Document 13: Proc. Soc. Exp. Biol. Med. 67, 539-541 (1948)
Non-patent Document 14: Journal of Antibiotics 37, 1600-1604 (1984)
Non-patent Document 15: Spectrochimica acta part A 67, 1374-1381 (2007)
Non-patent Document 16: Dermatologyca 100, 45-49 (1950)
Non-patent Document 17: Eur. J. Biochem. 118, 323-327 (1981)
Non-patent Document 18: Chemystry of Natural Compounds 41, 240-242 (2005)
Non-patent Document 19: Journal of Applied Microbiology 90, 622-629 (2001)
Non-patent Document 20: FEMS Microbiol. Lett. 316, 108-114 (2011)
Non-patent Document 21: Journal of Bacteriology 186, 1084-1096 (2004)
Non-patent Document 22: Can. J. Microbiol. 53, 901-911 (2007)
Non-patent Document 23: Peptides 1992: proceedings of the Twenty-Second European Peptide Symposium; Schneider, C. H., Eberle, A. N. Eds.: ESCOM: Leiden, 1993; pp 332-333

DISCLOSURE OF THE INVENTION

Problem to be Solved by the Invention

An object of the present invention is to provide a novel compound having antimicrobial activity and a plant disease control agent containing the same.

Means to Solve the Problem

As a result of intensive studies to explore a novel plant disease control agent, the present inventors have found that novel compounds (Compound 1 and Compound 2) represented by formula (1), which is Bacillomycin D comprising amino acid containing a side chain having 17 carbon atoms (C17) produced by *Bacillus* sp. has an effective antimicrobial activity as a plant disease control agent.

Compounds 1 and 2 have never been reported in the above-mentioned previous researches, let alone the activity thereof. The present inventors purified these compounds from *Bacillus* sp., determined a strict structure thereof, and found that they have an activity higher than that of conventionally-known related compounds. Furthermore, the present inventors have found that the effect of the compounds can be remarkably enhanced by incorporating surfactin which is a known lipopeptide and have accomplished the present invention.

That is, the present invention provides the following:
1. A plant disease control agent containing as an active ingredient a compound represented by formula (1) or salt thereof (1)

(in the formula, $R^1$ and $R^2$ represents a hydrogen atom or methyl group but excepting cases where $R^1$ and $R^2$ are the same).
2. The plant disease control agent as described in 1 above, wherein $R^1$ represents a hydrogen atom and $R^2$ represents methyl group.

3. The plant disease control agent as described in 1 above, wherein $R^1$ represents methyl group and $R^2$ represents a hydrogen atom.
4. The plant disease control agent as described in any one of 1 to 3 above, which further contains surfactin.
5. A plant disease controlling method characterized in applying the plant disease control agent as described in any one of 1 to 4 above to plants suffering from diseases.
6. A compound represented by formula (1) or salt thereof (1)

(in the formula, $R^1$ and $R^2$ represent a hydrogen atom or methyl group but excepting cases where $R^1$ and $R^2$ are the same).
7. The compound (Compound 1) as described in 6 above, wherein $R^1$ represents a hydrogen atom and $R^2$ represents methyl group, or salt thereof.
8. The compound (Compound 2) as described in 6 above, wherein $R^1$ represents methyl group and $R^2$ represents a hydrogen atom, or salt thereof.

EFFECTS OF THE INVENTION

Compound 1 and Compound 2 of the present invention have superior antimicrobial activity and can be used for safe agricultural and horticultural antimicrobial agents (plant disease control agents).

MODE FOR CARRYING OUT THE INVENTION

Figure 1:
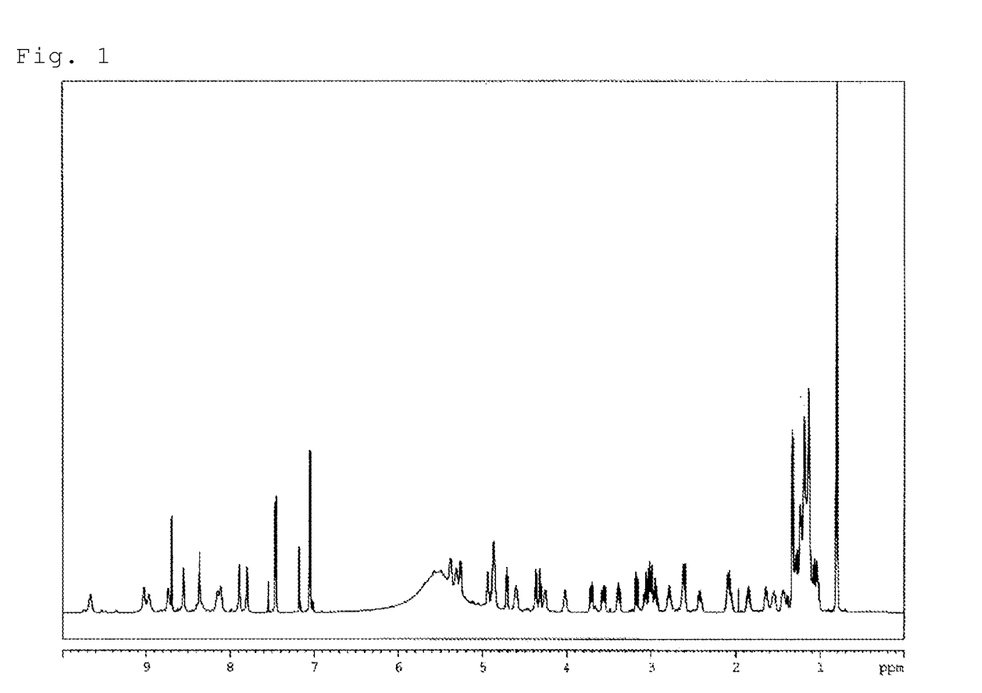
FIG. 1 shows $^1$H-NMR spectrum of Compound 1.
Figure 2:
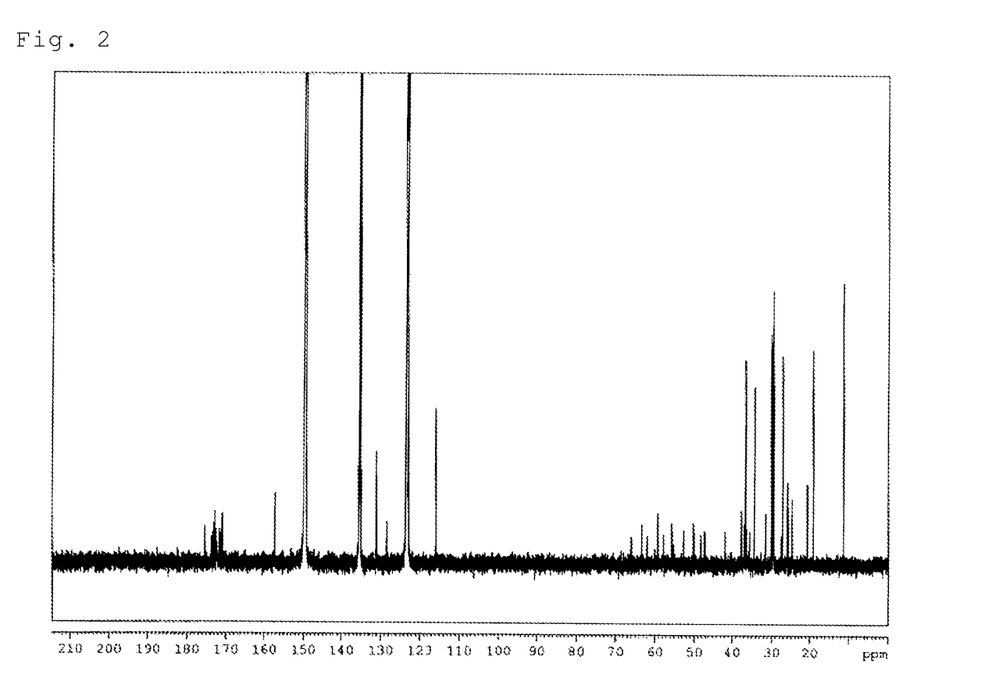
FIG. 2 shows $^{13}$C-NMR spectrum of Compound 1.
Figure 3:
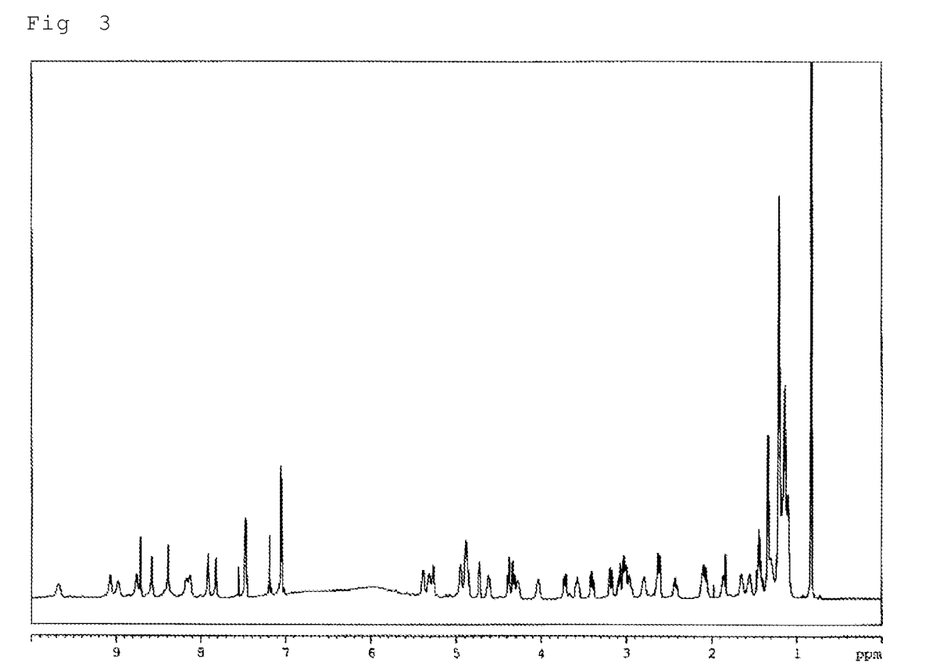
FIG. 3 shows $^1$H-NMR spectrum of Compound 2.
Figure 4:
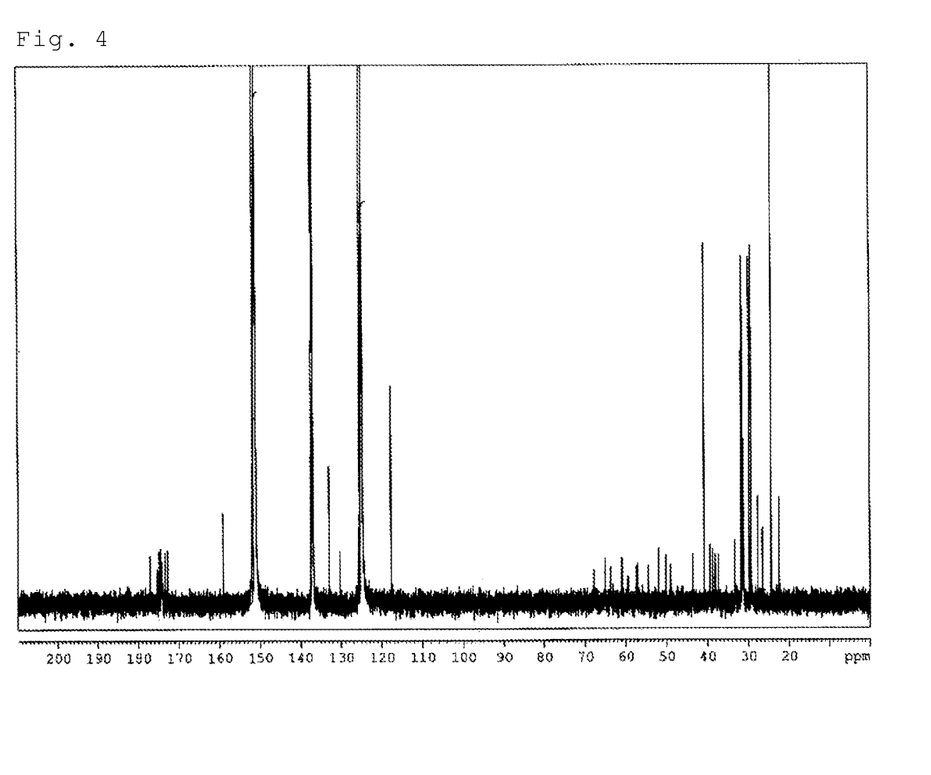
FIG. 4 shows $^{13}$C-NMR spectrum of Compound 2.

Physicochemical properties of Compounds 1 and 2 of the present invention are described below. The methods for measuring the physicochemical properties are as follows.
1. The color and shape were judged from outside appearance.
2. The mass spectra were measured using Waters Micromass LCT Premier XE.
3. The NMR spectra were measured using Bruker Avance II.
Physicochemical properties of Compound 1:
1) Color and shape: white powder,
2) Mass spectrum: m/z 1073.5902 (M+H)$^+$,
3) Molecular formula: $C_{51}H_{80}N_{10}O_{15}$,
4) $^1$H-NMR spectrum (600 MHz, $C_5D_5N$) (FIG. 1) δ(ppm): 0.81(3H, d), 0.81(3H, t), 1.06(1H, m), 1.10-1.23(m), 1.24(1H,m), 1.28(1H,m), 1.34(3H,d), 1.44(1H,m), 1.55 (1H, m), 1.64(1H, m), 1.85(1H, m), 2.08(2H, m), 2.42 (1H, m), 2.61(1H, m), 2.63(1H, m), 2.78(1H, m), 2.95 (1H, m), 3.00(1H, m), 3.04(1H, m), 3.09(1H, m), 3.18 (1H, dd), 3.39(1H, dd), 3.57(1H, dd), 3.71(1H, dd), 4.03 (1H, m), 4.26(1H, m), 4.32(1H, dd), 4.38(1H, dd), 4.61 (1H, m), 4.72(1H, dd), 4.87(1H, m), 4.88(1H, m), 4.88 (1H, m), 4.95(1H, m), 5.27(1H, dd), 5.32(1H, dd), 5.38 (1H, m), 7.05(2H, d), 7.46(2H, d), 7.80(1H, brs), 7.89(1H, brs), 8.12(1H, d), 8.14(1H, brs), 8.35(1H, brs), 8.36(1H, brs), 8.55(1H, brs), 8.73(1H, brs), 8.97(1H, brs), 9.02(1H, brs), 9.67(1H, brs), 5) $^{13}$C-NMR spectrum (150 MHz, $C_5D_5N$) (FIG. 2) δ(ppm):11.4, 19.2, 20.7, 24.9, 26.0, 27.3, 27.6, 29.5, 29.6, 29.7, 29.8, 29.8, 29.9, 29.9, 30.2, 31.6, 34.5, 35.7, 36.4, 36.8, 37.0, 37.7, 41.9, 47.3, 48.5, 50.2, 52.8, 55.4, 55.8, 57.9, 59.3, 62.1, 63.5, 66.1, 116.0, 128.6, 131.2, 157.4, 171.0, 171.6, 172.3, 172.4, 172.4, 172.6, 172.8, 173.2, 173.6, 173.7, 175.5
Physicochemical properties of Compound 2:
1) Color and shape: white powder,
2) Mass spectrum: m/z 1073.5876 (M+H)$^+$,
3) Molecular formula: $C_{51}H_{80}N_{10}O_{15}$,
4) $^1$H-NMR spectrum (600 MHz, $C_5D_5N$) (FIG. 3) δ(ppm): 0.84(6H, d), 1.11(2H, m), 1.11(1H, m), 1.15-1.21(m), 1.31(1H, m), 1.35(3H,d), 1.44(1H, m), 1.44(1H, m), 1.55 (1H,m), 1.65(1H, m), 1.86(1H, m), 2.09(2H, m), 2.42(1H, m), 2.62(1H, m), 2.63(1H, m), 2.79(1H, m), 2.97(1H, m), 3.01(1H, m), 3.04(1H, m), 3.09(1H, m), 3.18(1H, dd), 3.41(1H, dd), 3.57(1H, dd), 3.72(1H, dd), 4.04(1H, m), 4.28(1H, m), 4.33(1H, dd), 4.39(1H, dd), 4.62(1H, m), 4.73(1H, dd), 4.87(1H, m), 4.88(1H, m), 4.89(1H, m), 4.95(1H, m), 5.28(1H, dd), 5.32(1H, m), 5.39(1H, m), 7.06(2H, d), 7.47(2H, d), 7.80(1H, brs), 7.89(1H, brs), 8.13(1H, d), 8.17(1H, brs), 8.39(1H, brs), 8.40(1H, brs), 8.58(1H, brs), 8.75(1H, brs), 8.98(1H, brs), 9.07(1H, brs), 9.68(1H, brs), 5) $^{13}$C-NMR spectrum (150 MHz, $C_5D_5N$) (FIG. 4) δ(ppm):20.7, 22.7, 24.9, 26.0, 27.6, 27.6, 28.1, 29.5, 29.7, 29.8, 29.8, 29.9, 29.9, 29.9, 30.1, 31.6, 35.7, 36.4, 37.0, 37.7, 39.1, 41.9, 47.3, 48.5, 50.2, 52.8, 55.3, 55.8, 57.8, 59.3, 62.0, 63.5, 66.2, 116.0, 128.6, 131.2, 157.4, 171.0, 171.6, 172.4, 172.6, 172.6, 172.8, 173.2, 173.6, 173.7, 173.7, 175.4

There is no particular limit on the salt of Compounds 1 and 2. Examples thereof include sodium salt, potassium salt, calcium salt and ammonium salt, and sodium salt is preferable.

Compounds 1 and 2 can be obtained by culturing microorganisms capable of producing the compounds and collecting from the culture. Examples of the bacterium producing Compounds 1 and 2 include microorganisms of Bacillus genus, including Bacillus sp. AT-332 strain and Bacillus sp. AT-79 strain. Bacillus sp. AT-332 strain has been deposited as Bacillus sp. AT-332 and Bacillus sp. AT-79 strain has been deposited as Bacillus sp. AT-79 with the depositary institution, Biological Resource Center, National Institute of Technology and Evaluation (2-5-8 Kazusakamatari, Kisarazushi, Chiba 292-0818 JAPAN) (original deposit date (accepted date): May 2, 2011; Accession number: NITE BP-1095 and NITE BP-1094).

As a method for culturing microorganisms capable of producing Compounds 1 and 2, the microorganisms can be allowed to grow by known means such as the static culture on a solid medium and the liquid culture and the kind of the available medium, culture conditions and the like are not particularly limited as long as they can allow the bacteria to survive and grow. Examples of the medium include a medium containing glucose, peptone, yeast extract and the like as well as a general medium such as a meat extract. Also, other than a liquid medium, a solid medium such as an agar slant medium and a plate medium other than a liquid medium may be used.

All the carbon sources which the above-mentioned strains can utilize can be used for the medium. Specific examples include various synthetic or natural carbon sources which the microorganisms capable of producing Compounds 1 and 2 can utilize other than sugars such as glucose, galactose, lactose, sucrose, maltose, malt extracts, waste molasses, starch syrup and starch hydrolysate.

Similarly, various synthetic and natural substances which the above-mentioned strains can utilize such as an organic nitrogen-containing substance including peptone, meat extract, yeast extract, soy-bean powder and corn steep liquor can be used for the nitrogen source of the medium.

According to a conventional method for culturing microorganisms, inorganic salts such as dietary salt and phosphoric salt, salts of metal such as calcium, magnesium and iron and micronutrients such as vitamins and amino acids can be added as needed.

The culture can be performed under an aerobic condition such as the shake culture and aeration culture. The culture temperature is 20 to 40° C. and preferably 25 to 35° C., pH is 5 to 8 and preferably 6 to 7, and the culture period is one to four days and preferably two to three days.

As in the production example to be described later, when *Bacillus* sp. AT-332 strain is used, a mixed product of Bacyllomycin Ds containing a side chain of amino acids C15 to C17 is produced as antimicrobial metabolites. The ratio of each Bacyllomycin D may vary depending on culture conditions, but that containing a side chain of amino acid C15, C16 or C17 accounts for 2 to 15%, 15 to 45% and 40 to 70%, respectively, and Compounds 1 and 2 of the present invention containing a C17-amino-acid side chain can be obtained as a main component.

The method for the purification of Compounds 1 and 2 from the culture liquid is not particularly limited and can be carried out by a known method such as acid precipitation and salt precipitation, solvent extraction and various kinds of chromatography.

The surfactins used in the present invention are the compound disclosed in Non-patent documents 1 and 2, and a commercial product can be used.

Compounds 1 and 2 of the present invention are a novel Bacillomycin D product in which the β-amino acid side chain has 17 carbon atoms (C17) and have higher antimicrobial activity than conventionally-known related compounds. Accordingly, Compound 1 and Compound 2 of the present invention and salts thereof are useful for the plant disease control, and various plant disease can be prevented by allowing Compound 1, Compound 2 and a salt thereof or a diluent thereof to exist as a plant disease control agent containing Compound 1, Compound 2 or a salt thereof on the plant body such as roots, stems, leaves and seeds or in the grove soil.

The plant disease control agent containing Compound 1 or Compound 2 of the present invention or salts thereof can control the plant disease caused by fungi and bacteria belonging to Oomycetes, Ascomycetes, Basidiomycetes and Deuteromycetes depending on the type of application.

Specifically, the offending bacteria which the plant disease control agent containing Compound 1, Compound 2 or salts thereof of the present invention can control include *Pyricularia oryzae*, *Cochliobolus miyabeanus*, *Rhizoctonia solani* and *Gibberella fujikuroi* which infest rice; *Erysiphe graminis* f.sp. hordei, *Erysiphe graminis* f.sp. tritici, *Puccinia striiformis*, *Puccinia graminis*, *Puccinia recondita* f.sp. tritici, *Puccinia hordei*, *Gibberella zeae*, *Pyrenophorateres*, *Typhula incarnata*, *Typhula ishikariensis*, *Sclerotiniaborealis*, *Micronectriella nivalis*, *Ustilago nuda*, *Tilletia caries*, *Tilletia toetida*, *Tapesia yallundea*, *Phynchosporium secalis* f.sp. hordei, *Septoria tritici* and *Lentosphaeria nodorum* which infest wheats; *Diaporthe citri*, *Elsinoe fawcettii*, *Phytophthora citrophthora*, *Penicillium digitatum* and *Penicillium italicum* of citrus plants; *Monilinia mali*, *Valsa ceratosperma*, *Podosphaera leucotricha*, *Alternaria alternata* apple pathotype, *Venturia inaequalis*, *Gymnosporangium yamadae*, *Botriophaeria berengeriana* f.sp. piricola, *Zygophiala jamaicensis*, *Gloeodes pomigena*, *Mycosphaerella pomi*, *Glomerella cingulata* and *Diplocarponmali* of apples; *Venturia nashicola*, *Alternaria alternata* Japanese pear pathotype, *Physalospora piricola* and *Gymnosporangium asiaticum* of pears; *Monilinia fructicola*, *Cladosporium carpophilum* and *Phomopsis* sp. of peaches; *Pseudocercospora vitis*, *Marssonina viticola*, *Elsinoe ampelina*, *Glomerella cingulata*, *Uncinula necator*, *Phakopsora ampelopsidis* and *Phomopsis* sp. of grapes; *Phyllactinia kakicola*, *Colletotrichum gloeosporioides*, *Cercospora kaki* and *Mycosphaerella nawae* of persimmons; *Cladosporium carpophilum* of plums; *Monilinia fructicola* of Prunus avium; *Sphaerotheca fuliginea*, *Didymella bryoniae*, *Colletotorichum legenarium*, *Alternaria solani*, *Cladosporium fulvum* of gourds; *Phomopsis vexans* and *Erysiphe cichoracearum* of eggplants; *Alternaria japonica*, *Alternaria bracicae*, *Alternaria brassicicola* and *Cercosporella brassicae* of brassica vegetables; *Pucciniaallii* of green onions; *Pyrhium ultimum* and *Pythium zigiberis* of gingers; *Sphaerotheca humuli* and *Glomerella cingulata* of strawberries; *Cercospora kikuchii*, *Elsinoe glycines* and *Diaporthe phaseolorum* var. sojae of soybeans; *Cercospora canescens* and *Uromyces phaseoli* var. azukicola of azuki beans; *Colletotrichum lindemuthianum* of marrow beans; *Cercosporidium personatum*, *Cercospora arachidicola* and *Shaceloma arachidis* of peanuts; *Erysiphe pisi* of peas; *Alternaria solani* of potatoes; *Exobasidium reticulatum*, *Elsinoe leucospila*, *Pestalotiopsis theae* and *Pestalotiopsis longiseta* of teas; *Alternaria longipes*, *Erysiphe cichoracearum* and *Colletotrichum gloeosporioides* of tobaccos; *Cercospora beticola* of sugar beets; *Curvularia geniculata* and *Ceratobasidium* spp. of the lawn grass; *Diplocarpon rosae* and *Shaerotheca pannosa* of roses; *Septoria obesa* and *Puccinia horiana* of chrysanthemums; and *Botrytis cinerea* and *Sclerotinia sclerotiorum* of various crop plants, but not limited thereto.

The dosage of the plant disease control agent containing Compound 1, Compound 2 or salts thereof of the present invention can be appropriately determined in individual cases of the above-mentioned microorganisms.

As the plant disease control agent containing Compound 1, Compound 2 or salts thereof of the present invention, the compound can be directly used. Or the plant disease control agent can be diluted with inert liquid or a solid carrier to be used as a pharmacological agent with addition of the surfactant, dispersing agent and other adjuvant as needed. Examples of specific formulation include granular formulation, dust formulation, wettable powder, suspension agent and emulsion formulation.

Examples of the carrier include talc, bentonite, kaolin, clay, diatom earth, white carbon, vermiculite, lime hydrate, ammonium sulfate, silica sand, urea, a porous solid carrier and liquid carriers such as water, isopropyl alcohol, methyl naphthalene, xylene, cyclohexanone and alkylene glycol. Examples of the surfactant and dispersion agent include dinaphthylmethanesulfonic acid salts, alcohol sulfuric acid ester salts, lignin sulfonic acid salts, alkylarylsulfonic acid salts, polyoxyethylene glycol ethers, polyoxyethylene sorbitan monoalkylate and polyoxyethylene alkylaryl ethers. Examples of the adjuvant include carboxymethylcellulose, polyethylene glycol, propylene glycol, gum Arabic and xanthan gum; and examples of the cryoprotective agent include skim milk and pH buffering agent. The amount of the compound(s), the time of application and the application amount can be appropriately determined depending on each case of the above microorganisms.

The plant disease control agent comprising Compound 1, Compound 2 and salts thereof of the present invention can contain active ingredients other than those of the present invention: i.e. insecticides, other antimicrobial agents, herbicides, plant growth regulators and fertilizers.

Examples of the antimicrobial components include Iturin A, Iturin $A_L$, mycosubtilin, bacillomycin F, bacillomycin Lc, Fengycin, Bitertanol, bromuconazole, cyproconazole, difenoconazole, diniconazole, enilconazole, epoxiconazole, fluquinconazole, fenbuconazole, flusilazole, flutriafol, hexaconazole, imibenconazole, ipconazole, metconazole, myclobutanil, penconazole, propiconazole, prothioconazole, simeconazole, triadimefon, triadimenol, tebuconazole, tetraconazole, triticonazole, prochloraz, pefurazoate, imazalil, triflumizole, cyazofamid, benomyl, carbendazim, thiabendazole, fuberidazole, ethaboxam, etridiazole, oxypoconazole fumaric acid, himexazole, azoxystrobin, dimoxystrobin, enestroburin, fluoxastrobin, kresoxym-methyl, metominostrobin, oryzastrobin, picoxystrobin, pyraclostrobin, trifloxystrobin, carboxin, benalaxyl, boscalid, bixafen, fenhexamid, flutolanil, furametpyr, mepronil, metalaxyl, mefenoxam, ofurace, oxadixyl, oxycarboxin, penthiopyrad, thifluzamide, tianidil, dimethomorph, flumorph, flumetover, fluopicolide, carpropamid, diclocymet, mandipropamid, fluazinam, pyrifenox, bupirimate, cyprodinil, fenarimol, ferimzone, mepanipyrim, nuarimol, pyrimethanil, triforine, fenpiclonil, fludioxonil, aldimorph, dodemorph, fenpropimorph, tridemorph, fenpropidin, iprodione, procymidone, vinclozolin, famoxadone, fenamidone, octhilinone, probenazole, anilazine, diclomezine, pyroquilon, proquinazid, tricyclazole, captafol, captan, dazomet, folpet, fenoxanil, quinoxyfen, amisulbrom, mancozeb, maneb, metam, metiram, ferbam, propineb, thiuram, zineb, ziram, diethofencarb, iprovalicarb, benthiavalicarb-isopropyl, propamocarb hydrochloride, thiophanate methyl, pyribencarb, Bordeaux mixture, basic copper chloride, basic copper sulfide, cupric hydroxide, copper 8-hydroxyquinoline, dodine, iminoctadine albesilate, iminoctadine acetate, guazatine, kasugamycin, streptomycin, polyoxin, oxytetracycline, validamycin A, binapacryl, dinocap, dinobuton, dithianon, isoprothiolane, edifenphos, iprobenfos, fosetyl, fosetyl aluminum, pyrasophos, tolclofos-methyl, chlorothalonil, dichlofluanid, flusulfamide, hexachlorobenzene, phthalide, pencycuron, quintozene, cyflufenamid, cymoxanil, dimethirimol, ethyrimol, furalaxyl, metrafenone, spiroxamine, amobam, sulfur, lime sulfur, echlomezole, potassium bicarbonate, calcium bicarbonate, thiadiazine, tecloftalam, triazine, copper nonylphenol sulfonate, hydroxy isoxazole, fluoroimide, polycarbamate, methasulfocarb, EDDP, IBP, tolfenpyrad, fluopyram, isotianil and isopyrazam, but not limited thereto.

Examples of the insecticidal components include acetamiprid, pymetrozine, fenitrothion, acephate, carbaryl, methomyl, cartap, cyhalothrin, ethofenprox, teflubenzuron, flubendiamide, flufenoxuron, tebufenozide, fenpyroximate, pyridaben, imidacloprid, buprofezin, BPMC, MIPC, malathion, methidathion, fenthion, daiazinon, oxydeprofos, vamidothion, ethiofencarb, pirimicarb, permethrin, cypermethrin, bifenthrin, halfenprox, silafluofen, nitenpyram, chlorfluazuron, methoxyfenozide, tebufenpyrad, pyrimidifen, kelthane, propargite, hexythiazox, clofentezine, spinosad, milbemectin, BT (*Bacillus thuringiensis*), indoxacarb, metaflumizone, chlorfenapyr, fipronil, etoxazole, acequinocyl, pirimiphos-methyl, acrinathrin, quinomethionate, chlorpyrifos, abamectin, emamectin benzoate, fenbutatin oxide, terbufos, ethoprophos, cadusafos, fenamiphos, fensulfothion, DSP, dichlofenthion, fosthiazate, oxamyl, isoamidofos, fosthietan, isazophos, thionazin, benfuracarb, spirodiclofen, ethiofencarb, azinphos-methyl, disulfoton, methiocarb, oxidemethon-methyl, parathion, cyfluthrin, beta-cyfluthrin, tebupirimfos, spiromesifen, endosulfan, amitraz, tralomethrin, acetoprole, ethiprole, ethion, triclorfon, methamidophos, dichlorvos, mevinphos, monocrotophos, dimethoate, formetanate, formothion, mecarbam, thiometon, disulfoton, naled, methyl parathion, cyanophos, diamidafos, albendazole, oxibendazole, fenbendazole, oxfendazole, propaphos, sulprofos, prothiofos, profenofos, isofenphos, temephos, phenthoate, dimethylvinphos, chlorfenvinphos, tetrachlorvinphos, phoxim, isoxathion, pyraclofos, chlorpyifos, pyridaphenthion, phosalone, phosmet, dioxabenzofos, quinalphos, pyrethrin, allethrin, prallethrin, resmethrin, permethrin, tefluthrin, fenpropathrin, alpha-cypermethrin, lambda-cyhalothrin, delta-methrin, fenvalerate, esfenvalerate, flucythrinate, fluvalinate, cycloprothrin, thiodicarb, aldicarb, alanycarb, metolcarb, xylylcarb, propoxur, fenoxycarb, fenothiocarb, bifenazate, carbofuran, carbosulfan, sulfur, pyrifluquinazon, furathiocarb, diafenthiuron, diflubenzuron, hexaflumuron, novaluron, lufenuron, chlorfluazuron, tricyclohexyltin hydroxide, sodium oleate, potassium oleate, methoprene, hydroprene, binapacryl, chlorobenzilate, phenisobromolate, tetradifon, bensultap, benzomate, chromafenozide, halofenozide, endosulfan, diofenolan, tolfenpyrad, triazamate, nicotine sulfate, thiacloprid, thiamethoxam, clothianidin, dinotefuran, fluazinam, pyriproxyfen, fluacrypyrim, hydramethylnon, cyromazine, TPIC, thiocyclam, fenazaquin, polynactin complex, azadirachtin, rotenone, hydroxypropyl starch, mesulfenphos, phosphocarb, aldoxycarb, metham sodium, morantel tartrate, dazomet, levamisole hydrochloride, trichlamide, pyridalyl, chlorantraniliprole, cyenopyrafen and cyflumetofen, but not limited thereto.

The application method of the plant disease control agent of the present invention is not particularly limited and examples thereof include a method of spraying the agent directly on plants and insect pests, a method of spraying the agent on the soil, and a method of adding the agent to the water and fertilizer to be applied on plants and the soil. In addition, it is desirable to appropriately adjust the application amount of the drug product since the application amount varies depending on the disease being treated, the crops as the subject of the application, the application method, occurrence tendency of diseases, degree of the damage, environmental conditions and the formulations to be used.

As discussed above, the plant disease control agent characterized in comprising Compound 1, Compound 2 or salts thereof has a broad disease spectrum and can control various kinds of plant diseases. Since the plant disease control agent comprising these strains is highly safe for the environment and has control effects on various kinds of diseases, the plant disease control agent can prevent a wide range of diseases without using other means in combination.

EXAMPLES

The present invention is to be described in more details with Production Example, Formulation Examples and Test Examples, but the present invention is not limited to these examples.

Production Example: Cultivation and preparation of AT-332 strain

As a preculture, one loopful of the preserved AT-332 strain was inoculated on 60 ml per flask of a nutrient broth medium (available from Eiken Chemical Co., Ltd.) in a 500 ml conical flask with baffles, and subjected to shaking culture using a rotary shaker at 180 rpm and 28° C. for one day.

60 ml of the culture obtained by the above preculture was inoculated in a jar fermentor with a 5000 ml volume containing a 2,000 ml of LB medium (20 g of peptone, 10 g of yeast extract, 20 g of sodium chloride and water for the rest) and cultivated as the main culture at 500 rpm, aeration rate of 1 1/hour and 35° C. for three days.

About 1,800 g of culture obtained by the above main culture was centrifuged to obtain 1,500 ml of the culture supernatant.

The pH of 1,500 ml of the obtained culture supernatant was adjusted to 4.0 using HCl, and the culture supernatant was extracted with equivalent amount of ethyl acetate three times. After the ethyl acetate fraction was evaporated and suspended in water, the pH of the fraction was adjusted to 7.0 using sodium hydroxide. The obtained solution was allowed to be adsorbed to Sep Pak C18 column equilibrated with water in advance, thereby being eluted with 60 to 80% methanol. The obtained fraction was subjected to HPLC and five peaks having antimicrobial activity were isolated. The ratio of the abundance of each peak was found to be 7% of Peak 1 (C15 bacillomycin D), 31% of Peak 2 (comparative compound; iso-C16 bacillomycin D), 4% of Peak 3 (n-C16 bacillomycin D), 37% of Peak 4 (Compound 1) and 22% of Peak 5 (Compound 2).

Each of Peak 4 (Compound 1; about 350 mg), Peak 5 (Compound 2; about 200mg) and Peak 2 (comparative compound; iso-C16 bacillomycin D; about 300 mg) was isolated.

The analyses such as amino acid analysis, LC(ESI)/TOF-MS, $^1$H-NMR, $^{13}$C-NMR, HH-COSY, HSQC, NOESY, MALDI-TOF-MS/PSD, and Edman degradation revealed that the obtained Compound 1 and Compound 2 had the structure as described in the present specification. Peak 3 was confirmed to be iso-C16 bacillomycin D by the same methods.

Formulation Example 1

Preparation of Wettable Powder 5 parts (parts by mass, shall the same shall apply hereinafter) each of Compound 1, Compound 2, the comparative compound obtained by Production Example 1 and surfactin (produced by Sigma-Aldrich Japan Co. LLC.) was mixed and pulverized with 50 parts of diatom earth, 35 parts of white carbon, 8 parts of lignin sulfonate 2 parts of alkyl naphthalene sulfonate to thereby obtain wettable powder thereof, respectively.

Test Example 1

Comparison of In Vitro Antimicrobial Activity

Each of 1% w/v dimethylsulfoxide solution of Compound 1, Compound 2 and the comparative compounds was prepared. A predetermined amount of the solutions diluted with dimethylsulfoxide were fully mixed in the sterilized potato dextrose agar medium, and 15 ml of the resultant medium was poured into a petri dish 90 mm in diameter and allowed to stand at room temperature. As a control, the potato dextrose agar medium added with dimethylsulfoxide only was also prepared. After the medium was solidified, the mycelia was scooped with the medium from the colony of *Rhizoctonia solani*, *Pyricularia oryzae* and *Botrytis cinerea* as being typical plant pathogens, which had been cultivated in advance, using a cork baller 5mm in diameter; and inoculated in the center of the test medium. The fungi was cultivated in the petri dish at 25° C., and the diameter of the colony spread from the source of inoculum was measured on the second day to seventh day. The growth inhibition ratio between the diameter of the test colony and that of the control was determined by the following formula as an indication of the degree of inhibition. The results are shown in Table 2. Compounds 1 and 2 apparently had greater effects on the three kinds of the plant pathogens compared to the comparative compounds which had been disclosed in the past.

Growth inhibition ratio (%)={(diameter of the control colony−diameter of the test colony)/diameter of the control colony}×100     [Formula 1]

TABLE 2

| | Concentration (ppm) | Growth inhibition ratio (%) | | |
| --- | --- | --- | --- | --- |
| | | *Rhizoctonia solani* | *Pyricularia oryzae* | *Botrytis cinerea* |
| Compound 1 | 10 | 62 | 76 | 81 |
| Compound 2 | 10 | 82 | 90 | 95 |
| Comparative compound | 10 | 9 | 35 | 39 |

Test Example 2

Test for the Effects on Cucumber *Sphaerotheca fuliginea*

Sufficient doses of the diluent of wettable powder in Formulation Example 1 with the dilution rate of 1,000 times was sprayed on cucumbers (variety: Hikari No. 3 p-type) grown in a glasshouse to the third-leaf unfolding stage in a plastic pot 6 cm in diameter. As a comparative example, the diluent of Impression wettable powder (produced by SDS Biotech K.K.) with the dilution rate of 250 times was also subjected to the test in the same manner. The next day, suspension of the cucumber *Sphaerotheca fuliginea* spores was sprayed and inoculated. The cucumbers were allowed to stand at room temperature for ten days and the diseased area ratio in the first and second leaves (i.e. the first and second leaves from the ground) was investigated with eyes to thereby determine the control titer. The control titer (%) was calculated using the formula as described below. The results are shown in Table 3. By the treatment with Compounds 1 and 2 related to the present invention, the incidence of cucumber *Sphaerotheca fuliginea* was greatly reduced compared to the non-treated region, and significantly higher control effects were obtained compared to the cases of treatment with the comparative compound and comparative example. Furthermore, it was revealed that the effect can be enhanced synergetically with the use of surfactin.

Control titer=(1−(diseased area ratio in the sprayed region/diseased area ratio in the non-sprayed region))×100 [Formulation 2]

TABLE 3

| Test formulation | Dilution rate (times) | Control titer (%) |
|---|---|---|
| Compound 1 wettable powder | 1000 | 91 |
| Compound 2 wettable powder | 1000 | 96 |
| Comparative compound wettable powder | 1000 | 69 |
| Comparative drug (impression) | 250 | 60 |
| Compound 1 wettable powder | 2000 | 61 |
| Compound 2 wettable powder | 2000 | 68 |
| Surfactin wettable powder | 2000 | 0 |
| Compound 1 wettable powder + surfactin wettable powder | 2000 in each | 88 |
| Compound 2 wettable powder + surfactin wettable powder | 2000 in each | 92 |
| Non-treatment | — | 0 |

INDUSTRIAL APPLICABILITY

The compounds (Compounds 1 and 2) of the present invention can be used for a plant disease control agent containing Compound 1, Compound 2 or a salt thereof owing to the excellent antimicrobial activity.

The invention claimed is:

1. A plant disease controlling method, wherein said method comprises applying, to at least leaves of a diseased plant, a plant disease control composition,
   wherein said applying is by a technique selected from (a) and (b):
      (a) spraying said plant with said composition; and
      (b) watering said plant with water containing said composition,
   wherein said composition comprises, as an active ingredient, a compound represented by formula (1) or a salt thereof, (1)

and wherein $R^1$ and $R^2$ represents a hydrogen atom or a methyl group but excepting cases where $R^1$ and $R^2$ are the same.

2. The plant disease controlling method as claimed in claim 1, wherein $R^1$ and $R^2$ of the compound represented by formula (1), or a salt thereof, is a hydrogen atom and a methyl group, respectively.

3. The plant disease controlling method as claimed in claim 1, wherein $R^1$ and $R^2$ of the compound represented by formula (1), or a salt thereof, is a methyl group and a hydrogen atom, respectively.

4. The plant disease controlling method as claimed in claim 1, wherein the plant disease control composition further contains at least one kind of Bacillomycin D compound comprising a β-amino acid containing a side chain having 15 to 16 carbon atoms.

5. The plant disease controlling method as claimed in claim 1, wherein the plant disease control composition further contains surfactin.

6. The plant disease controlling method as claimed in claim 1, wherein the plant disease is a microbial disease, the plant disease control composition has antimicrobial activity, and the method comprises applying a dose-effective amount of the plant disease control composition to the plant.

* * * * *